United States Patent [19]

Öhman

[11] Patent Number: 5,213,757
[45] Date of Patent: May 25, 1993

[54] METHOD FOR FIXING A SPRING PACKAGE TO A TOP NOZZLE IN A FUEL ASSEMBLY OF A NUCLEAR POWER REACTOR

[75] Inventor: Lennart Öhman, Västerås, Sweden
[73] Assignee: ABB Atom AB, Västerås, Sweden
[21] Appl. No.: 863,566
[22] Filed: Apr. 6, 1992
[51] Int. Cl.⁵ ................................................. G21C 3/32
[52] U.S. Cl. ..................................... 376/261; 376/364
[58] Field of Search ............... 376/261, 364, 434, 446, 376/448, 285

[56] References Cited

U.S. PATENT DOCUMENTS 4,792,429  12/1988  Hatfield ............................... 376/446
4,938,919  7/1990  Rylatt ................................... 376/364

Primary Examiner—Daniel D. Wasil
Attorney, Agent, or Firm—Watson, Cole, Grindle & Watson

[57] ABSTRACT

A method for fixing a spring package (7) to a top nozzle (6) in a fuel assembly of a nuclear reactor wherein the fuel assembly comprises fuel rods, guide tubes and spacers arranged in a bundle between a top nozzle (6) and a bottom nozzle (5) wherein a T-shaped slot (14) is milled out in a clamp (8) which is welded to or forms an integral part of the top nozzle (6) for receiving one end of the spring package (7), the end of the spring package is then inserted into the slot (14), and the end is then fixed in the slot by means of a locking pin (15).

6 Claims, 3 Drawing Sheets

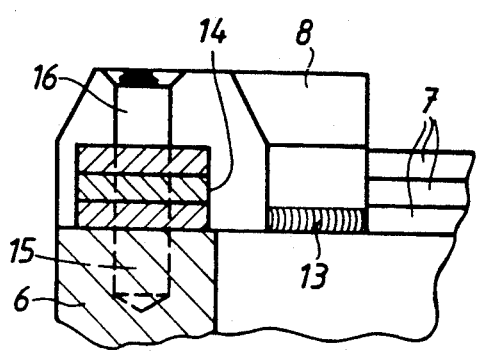
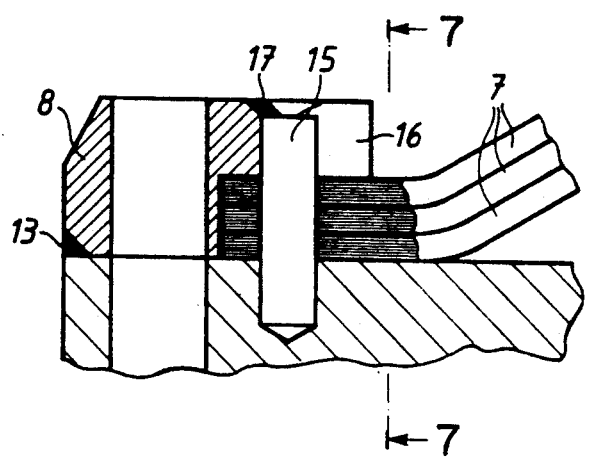
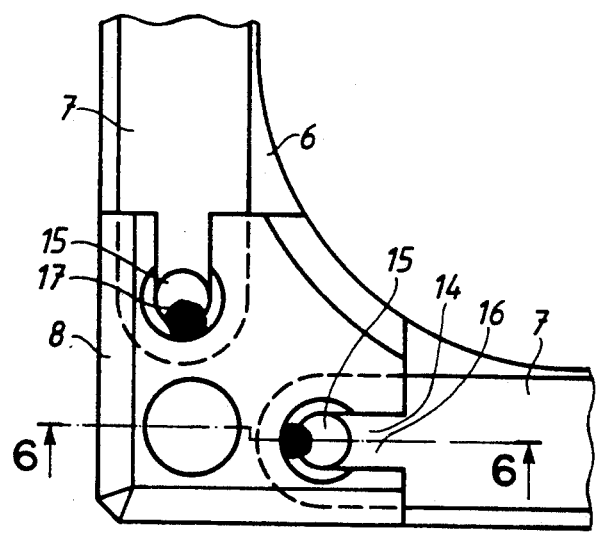

METHOD FOR FIXING A SPRING PACKAGE TO A TOP NOZZLE IN A FUEL ASSEMBLY OF A NUCLEAR POWER REACTOR

BACKGROUND OF THE INVENTION

The present invention relates to a method for fixing a spring package to a top nozzle in a fuel assembly of a nuclear power reactor.

FIG. 1 shows a known fuel assembly 1 for a pressurized-water reactor. The fuel assembly 1 contains fuel rods 2 and guide tubes 3 retained into a bundle by the spacers 4. The bundle is placed between a bottom nozzle 5 and a top nozzle 6. The top nozzle is provided with springs in the form of spring packages 7 for holding the fuel assembly 1 pressed against the bottom in the reactor core. The spring package 7 is fixed to the top nozzle 6 by means of a clamp 8 and a screw 9. FIGS. 2 and 3 show in more detail how the spring package 7 has been fixed to the top nozzle 6. FIG. 3 shows that the clamp 8 itself is fixed to the top nozzle 6 by means of a screw 10. FIG. 4 shows how the device is intended to operate. On the left, the fuel assembly 1 is positioned on the lower core plate 11. On the right, the fuel assembly 1 is shown when the upper core plate 12 has been mounted. In this latter position, the spring package 7 acts against the core plate 12 and retains the fuel assembly 1 in position in spite of a great upward flow of coolant in the core. Occasionally, however, the screw joint 9, 10 has broken. This has caused screw heads and spring packages 7 to loosen from the top nozzle 6 and caused the insertion of the control rods of the reactor to become blocked, thus jeopardizing the shutdown of the reactor. When the spring packages 7 loosen, the heavy upward coolant flow in the reactor core causes the fuel assembly 1 to lift. This may cause damage to the control rods and to the upper and lower core plates of the reactor.

SUMMARY OF THE INVENTION

According to the invention, the above drawback is eliminated by the clamp being welded to, or forming an integral part of, the top nozzle and, thereafter, by milling out a slot in the clamp for receiving one end of the spring package, inserting the end of the spring package into the slot and fixing it therein by means of a locking pin.

BRIEF DESCRIPTION OF THE DRAWINGS

The invention will be most readily understood with reference to the accompanying FIGS. 5-7, wherein FIG. 5 shows the clamp seen from above, FIG. 6 a section 6—6 of FIG. 5 and FIG. 7 a section 7—7 of FIG. 6. In these figures the same designations are used as in the above-mentioned figures.

DETAILED DESCRIPTION OF THE PREFERRED EMBODIMENT

Figure 1:
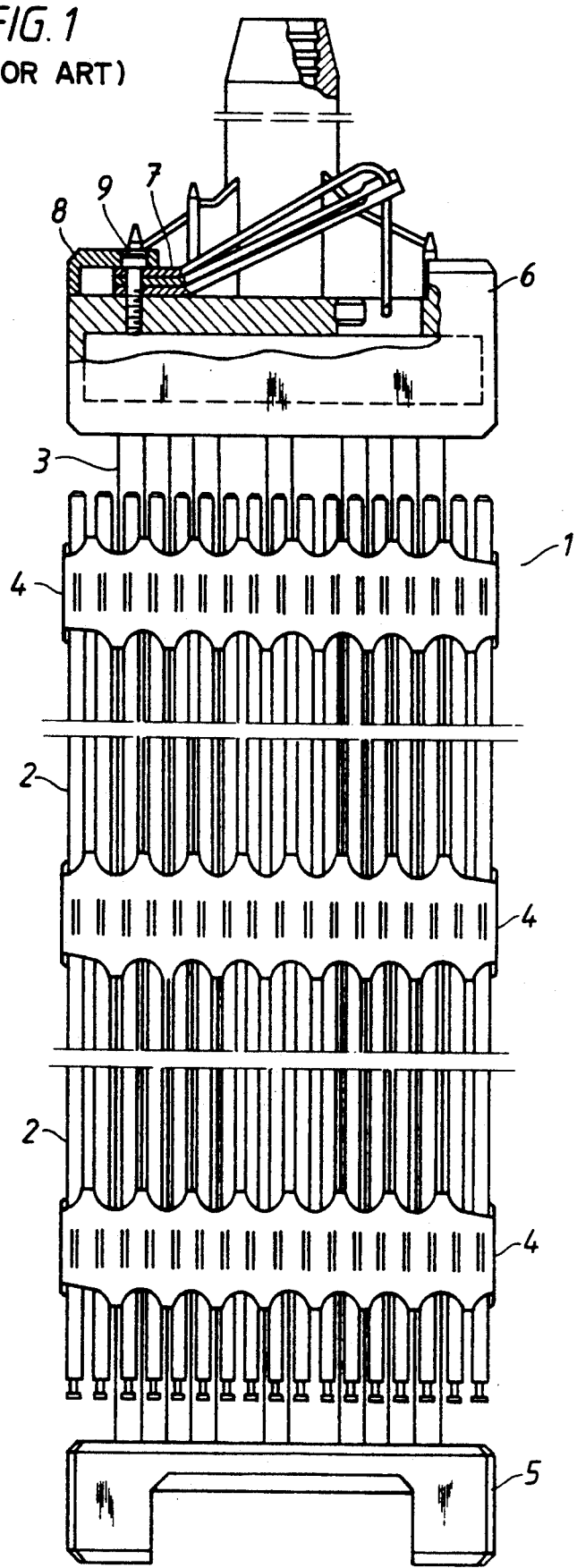
FIGS. 1-4 show a known fuel assembly and spring package arrangement.
Figure 2:
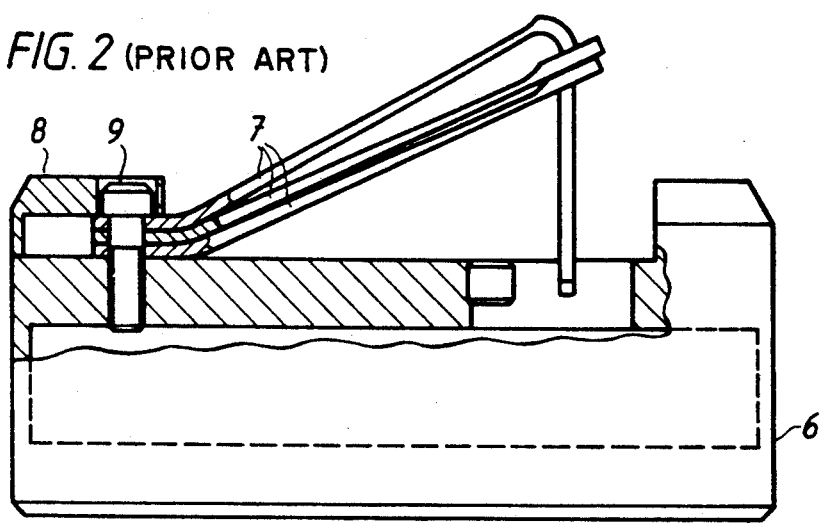
Figure 3:
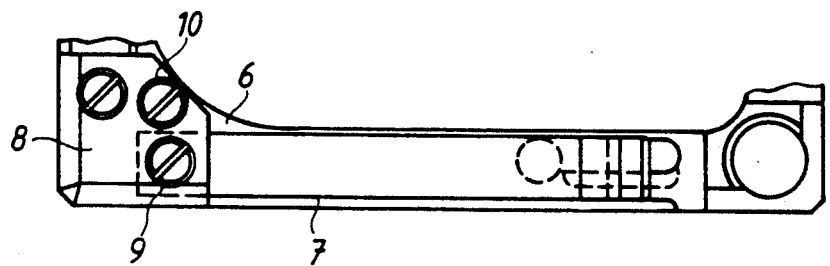
Figure 4:
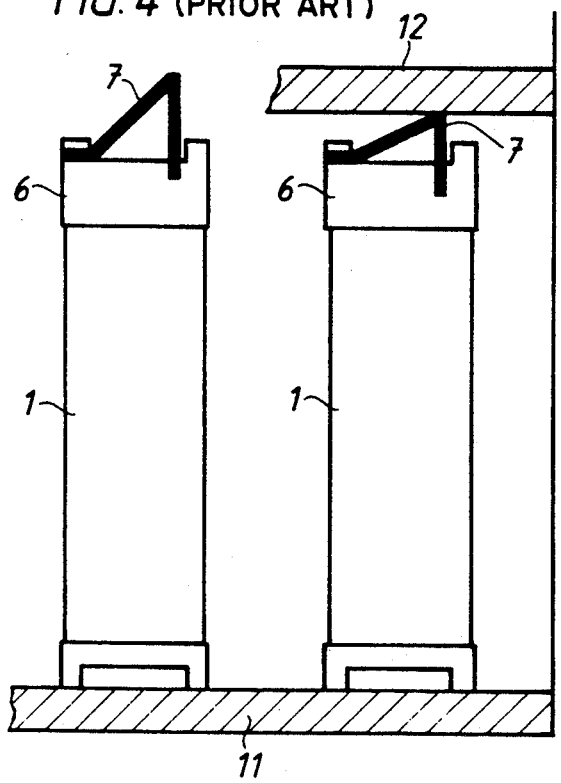

FIGS. 5-7 show how the clamp 8 is fixed by means of welds 13 at a corner of the top nozzle 6. Thereafter, a T-shaped slot 14 is milled out in the clamp 8. It is necessary to perform the milling of the slot 14 after the clamp 8 has been welded in position. If the milling were to be performed before that, as in the known design where the slot in the clamp 8 is milled out from the bottom, there would be a risk of the weld entering the milled-out slot 14 since the wall of the clamp 8 is relatively thin at that point. In such a case, difficulties in passing the spring package 7 into the slot 14 could arise, especially as it is desired to have a good fit between the spring package 7 and the slot 14. The fact that the slot 14 now becomes T-shaped is due to the milling tool consisting of a pulley on a shaft. The shaft may be of such a nature that it mills out the column in the T-shaped slot 14, or the column or slit 16 may first be milled out with a separate tool. The result is that the locking pin 15 cannot be fixed in a bored circular hole in the clamp 8 but is placed in the slit 16. Since the only function of the locking pin 15 is to prevent the spring package 7 from sliding out of the slot 14 and is not needed for fixing the clamp 8 to the top nozzle 6, this is a fully satisfactory solution. All moment forces from the spring package 7 are now taken up by the clamp 8 and are transmitted via the welds 13 to the top nozzle 6. The locking pin 15, which passes through a hole in the spring package 7 and into a hole in the top nozzle 6, is completely relieved and need only be fixed in its position so that it does not loosen by means of, for example, a spot weld 17.

The design thus provides a stable and reliable fixing of the spring package 7 to the top nozzle 6. The risk that the spring package might become detached because of stress corrosion, entailing rupture of a fixing screw as in the known design, is now completely eliminated.

I claim:

1. A method of fixing a spring package to a top nozzle of a fuel assembly of a nuclear reactor so as to press the fuel assembly against the bottom of the reactor core of the nuclear reactor, the fuel assembly including fuel rods, guide tubes and spacers arranged in a bundle between a top nozzle and a bottom nozzle, the method including the steps of:
    (a) welding a clamp to the top nozzle,
    (b) milling out a T-shaped slot in the clamp for receiving one end of the spring package with a close fit,
    (c) inserting said one end of the spring package into the slot, and
    (d) fixing said one end of the spring package in the slot with a locking pin such that all moment forces from the spring package are taken up by the clamp and no moment forces are applied to the locking pin.

2. The method of claim 1, wherein said clamp includes a upper surface and a plurality of side surfaces, and wherein said T-shaped slot includes a horizontal portion that extends inwardly of a side surface of said clamp and is enclosed on lateral sides thereof and a vertical portion which extends from said horizontal portion up to the upper surface of said clamp.

3. The method of claim 2, wherein in step (d) said locking pin is extended downwardly within said vertical portion of said T-shaped slot, through a hole in said one end of said spring package and into the top nozzle of said fuel assembly.

4. A method fixing a spring package to a top nozzle of a fuel assembly of a nuclear reactor so as to press the fuel assembly against the bottom of the reactor core of the nuclear reactor, the fuel assembly including fuel rods, guide tubes and spacers arranged in a bundle between a top nozzle having an integral clamp and a bottom nozzle, the method including the steps of:
    (a) milling out a T-shaped slot in the clamp for receiving one end of the spring package with a close fit, (c) inserting said one end of the spring package into the slot, and (d) fixing said one end of the spring package in the slot with a locking pin such that all moment forces from the spring package are taken up by the clamp and no moment forces are applied to the locking pin.

5. The method of claim 4, wherein said clamp includes a upper surface and a plurality of side surfaces, and wherein said T-shaped slot includes a horizontal portion that extends inwardly of a side surface of said clamp and is enclosed on lateral sides thereof and a vertical portion which extends from said horizontal portion up to the upper surface of said clamp.

6. The method of claim 5, wherein in step (c) said locking pin is extended downwardly within said vertical portion of said T-shaped slot, through a hole in said one end of said spring package and into the top nozzle of said fuel assembly.

* * * * *